United States Patent [19]

Fujioka

[11] Patent Number: 5,624,483
[45] Date of Patent: Apr. 29, 1997

[54] HOT MELT INK UTILIZABLE FOR INK JET PRINTER

[75] Inventor: Masaya Fujioka, Nagoya, Japan

[73] Assignee: Brother Kogyo Kabushiki Kaisha, Aichi-ken, Japan

[21] Appl. No.: 419,123

[22] Filed: Apr. 10, 1995

[30] Foreign Application Priority Data

Apr. 11, 1994 [JP] Japan ............... 6-071858

[51] Int. Cl.$^6$ ............... C09D 11/02; C09D 11/12
[52] U.S. Cl. ............... 106/31.24; 106/31.3; 106/31.61; 106/31.62
[58] Field of Search ............... 106/22 A, 22 H, 106/27 R, 31 R, 30 A, 20 R

[56] References Cited

U.S. PATENT DOCUMENTS

| | | | |
|---|---|---|---|
| 4,390,369 | 6/1983 | Merritt et al. | 106/31 R |
| 4,659,383 | 4/1987 | Lin et al. | 106/27 R |
| 4,758,276 | 7/1988 | Lin et al. | 106/27 R |
| 4,822,418 | 4/1989 | Lin et al. | 106/27 R |
| 5,041,161 | 8/1991 | Cooke et al. | 106/22 A |
| 5,141,559 | 8/1992 | Shinozuka et al. | 106/22 A |
| 5,259,873 | 11/1993 | Fujioka | 106/23 A |

FOREIGN PATENT DOCUMENTS

| | | |
|---|---|---|
| 099682 | 2/1984 | European Pat. Off. . |
| 0181198 | 5/1986 | European Pat. Off. . |

OTHER PUBLICATIONS

Japanese Patent Application Laid–Open No. 5–125316 May 1993.

Japanese Patent Application Laid–Open No. 58–108271 Jun. 1983.

Japanese Patent Application Laid–Open No. 59–22973 Feb. 1984.

Japanese Patent Application Laid–Open No. 61–83268 Apr. 1986.

Japanese Patent Publication No. 2–18710 Apr. 1990.

European Search Report Appln. No. EP 95 30 2407 Communication dated Aug. 14, 1995.

Primary Examiner—Helene Klemanski
Attorney, Agent, or Firm—Kane, Dalsimer, Sullivan, Kurucz, Levy, Eisele and Richard, LLP

[57] ABSTRACT

Disclosed is a hot melt ink utilizable for an ink jet printer, the hot melt ink comprising: a vehicle composed of paraffin wax (73% by weight ), paraffin wax derivatives (19.8% by weight) and petroleum resin (5% b weight); colorant composed of carbon black (2% by weight); additive agent composed of acetalkoxy aluminium di-isopropylate (0.2% by weight) as aluminium coupling agent. In the hot melt ink, the heat of melting is 190 mJ/mg, the softening point is 64° C. and the viscosity in the melted liquid state at the ink jetting temperature (125° C.) is 15 cp.

14 Claims, 2 Drawing Sheets

HOT MELT INK UTILIZABLE FOR INK JET PRINTER

BACKGROUND OF THE INVENTION

1. Field of the Invention

The present invention relates to a hot melt ink utilizable for an ink jet printer, in particular to a hot melt ink which exists in a solid state at a room temperature (ordinary temperature) and is used in an ink jet printer after being thermally melted over the room temperature when printing is conducted by the ink jet printer.

2. Description of Related Art

In general, an ink jet printer has various advantages in printing because of being noiseless, high speed printing, high quality printing and ability of color printing. On the other hand, since the ink jet printer conducts printing by directly adhering onto a print sheet ink droplets jetted from nozzles, printing quality or drying time of the ink droplets is influenced by quality of the print sheet, as a result, there is a problem that printing quality of the ink jet printer remarkably goes down when printing is conducted onto a print sheet with low quality.

In order to dissolve the above problem, it has been conventionally proposed an ink jet printer which can print images with ink dots having uniform diameters onto the print sheet in spite of quality of the print sheet, by using a hot melt type ink which has a melting point higher than the room temperature. As ink components of the hot melt ink, it is known an ink including a natural wax disclosed in the specification of U.S. Pat. No. 4,390,369 (Japanese Patent Application Laid Open No. Sho 58-108,271), an ink including stearic acid disclosed in the specification of U.S. Pat. No. 4,758,276 (Japanese Patent Application Laid Open No. SHo 59-22,973), and an ink which includes acid or alcohol of carbon number 20–24 and acid or alcohol of carbon number 14–19 and includes keton a having relatively high melting point and a dye as colorant, disclosed in the specification of U.S Pat. No. 4,659,383 (Japanese Patent Application Laid Open No. Sho 61-83,268). Further, it is disclosed in U.S. Pat. No. 4,659,383 and Japanese Patent Application after substantive examination, Laid Open No. Hei 2-18,710, a hot melt ink in which a solid pigment is dispersed in wax having a melting point higher than 65° C., or fatty acid or alcohol of carbon number 18–24.

In Japanese Patent Application Laid Open No. Hei 5-125,316, it is disclosed hot melt ink components which include a natural wax having penetration grade less than 2, the penetration grade being measured by a penetration testing apparatus and appreciated based on a depth that a needle penetrates under a predetermined condition according to Japanese Industrial Standard (JIS) K2207, K2220, K2235, dye dissolving agent with a melting point higher than 80° C. and dye. By utilizing such hot melt ink, it can prevent inferiority of printing quality occurring due to blurring generated when the ink is re-melted during ink fixation by heat or pressure, or due to offset generated when the ink is adhered to a pressure roller.

However, the above mentioned hot melt ink cannot be sufficiently soaked into the print sheet, thereby fixation property of the hot melt ink is not enough. On the contrary, the conventional hot melt ink tends to soak into the print sheet too easily, as a result, the ink penetrates to the rear surface of the print sheet. Further, among the conventional hot melt inks, there exists an ink which is solidified while it does not sufficiently spread on the printing surface of the print sheet after ink droplets thereof reach onto the printing surface. In such case of the hot melt ink, it cannot be obtained sufficient printing density (quality), since gaps between ink dots are outstanding and surfaces of the ink dots become hemispherical rather than flat. Contrarily, in case that the hot melt ink tends to soak into the print sheet too easily, there is a problem that printing density on the printing surface is made thin.

As concerns the fixation of the ink and the printing density, in Japanese Patent Application Laid Open No. Hei 5-125,316 mentioned above, it is able to improve both the fixation and the printing density by fixing the ink dots through heating or pressure roller. But, though the fixation property of the ink and the printing density will be improved to some extent by using the above methods if the ink cannot be sufficiently soaked into the print sheet, a fixing device such as a heater or a pressure roller has to be additionally installed in the ink jet printer. Thereby, cost of the ink jet printer necessarily increases. Further, it cannot take measures against the fixation property or the printing density if it is used the ink which is soaked into the print sheet too easily.

SUMMARY OF THE INVENTION

Accordingly, it is an object of the present invention to overcome the above mentioned problems and to provide a hot melt ink utilizable for an ink jet printer, the hot melt ink having good soaking property, spreading property and smoothness on a print sheet, thereby images can be printed on the print sheet with enough fixation property and printing density without fixing through a heater or pressure roller.

To accomplish the object, the present invention comprises a hot melt ink utilizable for an ink-jet printer, the hot melt ink existing a solid state at a room temperature and being used in a liquid state after melted, the hot melt ink comprising:

a vehicle which retains the solid state at the room temperature and is melted into the liquid state by heating over a melting point thereof; and a colorant;

wherein a heat of melting lies in a range of 100–200 mJ/mg, a softening point lies in a range of 50°–70° C. and a viscosity lies in a range of 10–30 cp at a fusible temperature higher than the melting point.

In the above hot melt ink for an ink jet printer, the vehicle included therein acts as medium in which the colorant is dissolved or dispersed. Here, the vehicle exists in a solid state at a room temperature and becomes a liquid state over a melting point thereof by being melted through heat energy. At that time, the melted ink in a liquid state concludes to have a viscosity capable for jetting from nozzles installed in the ink jet printer and such melted ink is able to exist with heat stability at a jetting temperature. The vehicle may be composed of one component alone, or mixture of two or more components. Further, the vehicle may include a liquid component at the normal temperature so long as it retains the above properties.

The colorant in the hot melt ink exists in a dissolved state or a dispersed state in the vehicle and the colorant acts to give a property as an ink by coloring the vehicle. Here, as the colorant, it may be selectively used pigment or dye, preferably organic pigment, inorganic pigment, oil-soluble dye or organic solvent soluble dye.

Here, it can raise a heat of melting and a softening point of the ink, as factors which influence to fixation property of the ink, penetration property thereof into a print sheet, spreading property thereof on the print sheet. Then, as shown in FIG. 1, it is generally known that the heat of melting is indicated as an area (oblique lines are added) in a thermogram (DSC curve) which is measured Differential Scanning Calorimeter (abbreviated as DSC hereinafter). The heat of melting is defined as a heat quantity absorbed when the ink is melted. Further, the softening point, as shown in FIG. 2, is a temperature from which heat absorption is started in the DSC curve and the ink starts to be softened from the softening point. Further, the melting point, as shown in FIG. 3, is indicated as a temperature corresponding to the lowermost peak in the DSC curve. At the melting point, endothermic energy becomes to the maximum value.

When the ink droplet is reached on the print sheet, exothermic quantity emitted from solidifying ink droplet becomes high if the heat of melting in the ink is high. Therefore, solidification of the ink is delayed. In this case, ink dot becomes a flat shape on its top, remarkably penetrates into the print sheet and widely spreads on the print sheet. On the other hand, if the heat of melting in the ink is low, the ink quickly solidifies, therefore the ink dot becomes a hemispherical shape on its top, only slightly penetrates into the print sheet and spreads not so widely.

Further, when the ink droplet is reached on the print sheet, it takes a comparatively long time until the ink solidifies if the softening point of the ink is low. Therefore, the ink dot becomes a flat shape on its top, remarkably penetrates into the print sheet and widely spreads on the print sheet. On the contrary, if the softening point is high, the ink quickly solidifies, therefore the ink dot becomes a hemispherical shape on its top, only slightly penetrates into the print sheet and spreads not so widely.

As concerns the viscosity of the ink, in case that the viscosity of the ink is low and the ink droplet is reached on the print sheet, the ink droplet tends to be easily penetrated into the print sheet and to easily spread on the print sheet since fluidity of the ink becomes high on the basis of its low viscosity. Contrarily, in case that the viscosity of the ink is high, the ink droplet is hard to be penetrated into the print sheet and to be spread thereon because fluidity of the ink becomes poor.

As mentioned above, if the heat of melting is high, the softening point is low and the viscosity is low, the ink becomes extremely hard to be solidified. On the other hand, if the heat of melting is low, the softening point is high and the viscosity is high, the ink tends to be easily solidified.

Taking into consideration the above properties of the heat of melting, the softening point and the viscosity in the ink, the heat of melting lies in a range of 100–200 mJ/mg, the softening point lies in a range of 50°–70° C. and the viscosity lies in a range of 10–30 cp at a fusible temperature higher than the melting point, in the hot melt ink of the present invention.

According to the hot melt ink of the present invention, based on that the heat of melting lies in a range of 100–200 mJ/ mg, the softening point lies in a range of 50°–70° C. and the viscosity lies in a range of 10–30 cp at a fusible temperature higher than the melting point, the penetration property into the print sheet , the spreading property on the print sheet and the flatness property of the ink can be made suitable for ink jet printing, when the ink droplet is reached onto the print sheet. As a result, the fixation property of the ink on the print sheet can be improved, thereby it can be obtained high printing density since spaces among the ink dots almost disappear. Therefore, the hot melt ink of the present invention satisfies all elementary properties necessary for the ink used in an ink jet printer, accordingly, by using the hot melt ink to an ink jet printer, images can be printed on the print sheet with enough fixation property and high printing density without fixing through a heater or pressure roller and further images with good transparency can be printed on a OHP (Over Head Projector) film.

Here, if the heat of melting excesses 200 mJ/mg, or the softening point is lower than 50° C., or the viscosity is lower than 10 cp, there occur the problems that the ink tends to penetrate to the rear surface of the print sheet and blurring of the ink is produced. On the contrary, if the heat of melting is lower than 100 mJ/mg, or the softening point is higher than 70° C., or the viscosity is higher than 30 cp, the fixation property of the ink becomes remarkably poor and the printing density becomes insufficient.

The above and further objects and novel features of the invention will more fully appear from the following detailed description when the same is read in connection with the accompanying drawings. It is to be expressly understood, however, that the drawings are for purpose of illustration only and not intended as a definition of the limits of the invention.

BRIEF DESCRIPTION OF THE DRAWINGS

The invention will be described with reference to the following drawings, wherein.

DETAILED DESCRIPTION OF THE PREFERRED EMBODIMENTS

Figure 1:
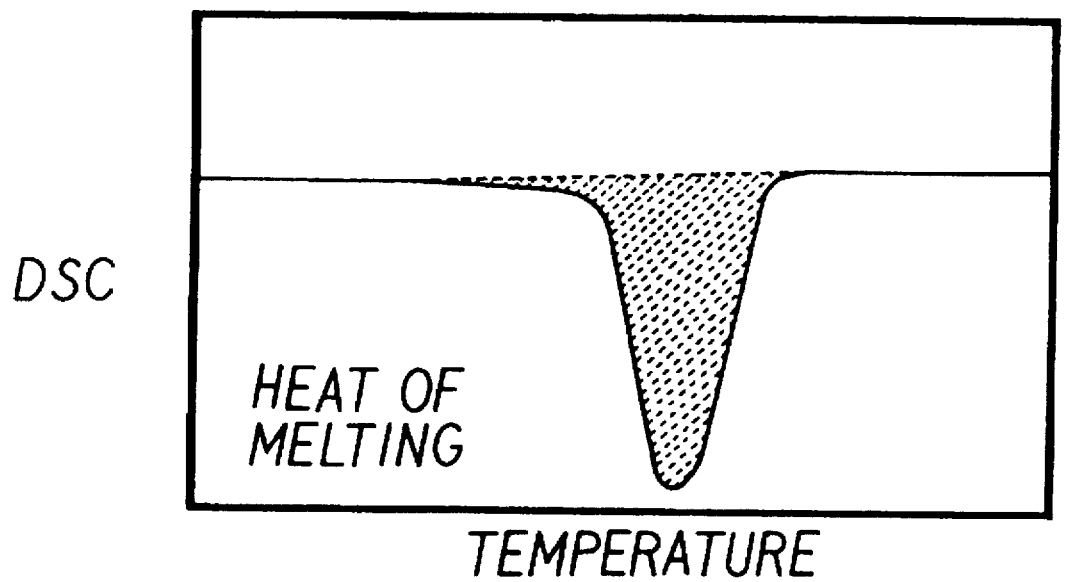
FIG. 1 is a graph for explaining a heat of melting which is measured through a Differential Scanning Calorimeter (DSC)
Figure 2:
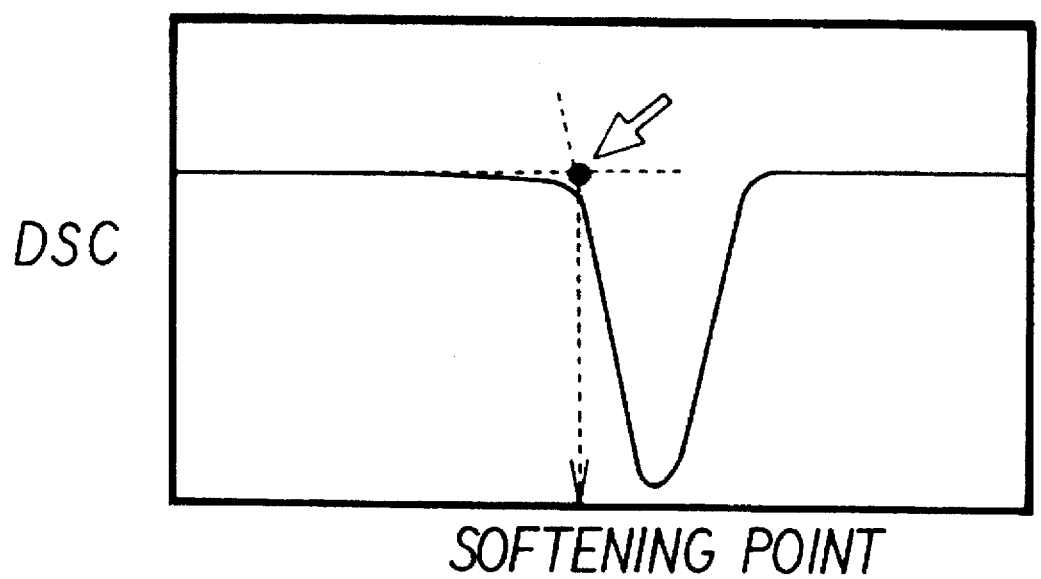
FIG. 2 is a graph for explaining a softening point which is measured through the DSC.
Figure 3:
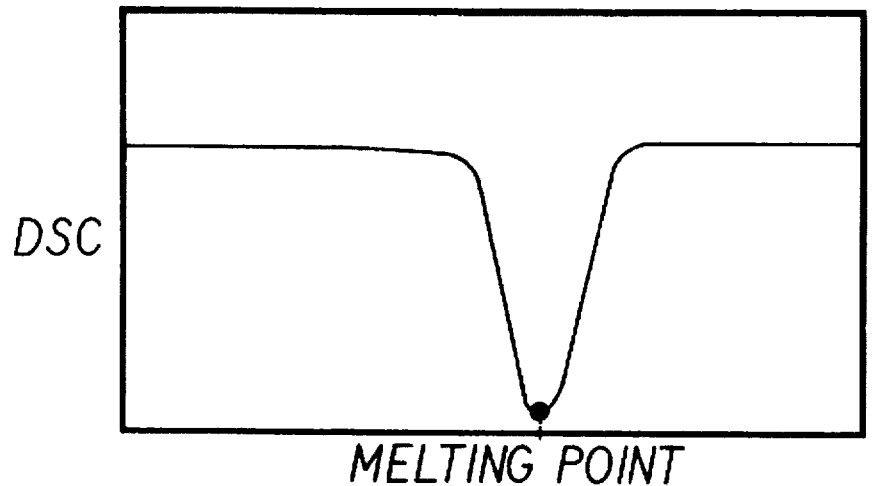
FIG. 3 is a graph for explaining a melting point which is measured through the DSC.

A detailed description of the preferred embodiment will now be given referring to the accompanying drawings. The hot melt ink according to the embodiment includes a vehicle which retains a solid state at the room temperature (20°–25° C.) and melts into a liquid state by heating over its melting point, and a colorant. A heat of melting in the hot melt ink lies in a range of 100–200 mJ(Joule)/mg, a softening point thereof lies in a range of 50°–70° C. and a viscosity thereof lies in a range of 10–30 cp (centi poise) at a temperature higher than the melting point, preferably such temperature lying in a range of 100° C.–150° C. and corresponding to a jetting temperature when the melted ink is jetted from the nozzles.

Here, it is desirable that the melting point of the above vehicle is more than at least 50° C. As the vehicle, it can be used various materials. For instance, it is preferable to add in the vehicle a solid wax or resin which retains a solid state at the room temperature as one component of the vehicle.

As the solid wax which retains a solid state at the room temperature and is used as one component of the vehicle, it can be used, for example, one or more materials selected from a group consisting : petroleum wax preferably such as paraffin wax or microcrystalline wax; mineral wax preferably such as montan wax, ozokerite or ceresin; wax of plant origin preferably such as candelilla wax, carnauba wax, rice wax or hohoba solid wax; wax of animal origin preferably such as bee wax, lanolin wax or whale wax; synthesized hydrocarbon preferably such as Fischer-Tropsch wax or polyethylene wax; hydrogenated wax preferably such as hardened castor oil or hardened castor oil derivatives; denatured wax preferably such as montan wax derivatives or paraffin wax derivatives, microcrystalline wax derivatives or polyethylene wax derivatives; higher fatty acid preferably such as behenic acid, stearic acid, palmitic acid, myristic acid or lauric acid; higher alcohol preferably such as stearyl alcohol or behenyl alcohol; hydroxystearic acid preferably such as 1,2-hydroxy stearic acid or 1,2-hydroxy stearic acid derivatives; ketone preferably such as stearone or laurone; fatty acid amide preferably such as lauric amide, stearic amide, oleic amide, eruca amide, ricinoleic amide, 1,2-hydroxy stearic amide, or N-substituted fatty acid amide; amine preferably such as dodecyl amine, tetradecyl amine or octadecyl amine; ester preferably such as methyl stearate, octadecyl stearate, glycerine fatty acid ester, sorbitan fatty acid ester, propylene glycol fatty acid ester, ethylene glycol fatty acid ester or polyoxyethylene fatty acid ester; polymer wax preferably such as α-olefin maleic acid anhydride copolymer wax. The above normal temperature solid wax may be used alone or as a mixture of two or more of them.

Here, among the waxes mentioned above, in case that it is used the wax with low polarity, for example, such as paraffin wax, microcrystalline wax, ozokerite, ceresin, polyethylene wax, Fischer-Tropsch wax, stearone, laurone, methyl stearate or octadecyl stearate, it is desirable that the wax with low polarity mentioned above is used in a mixture with other wax having relatively high polarity. Thereby, dispersibility and solubility of the pigment or the dye as the colorant is remarkably improved.

As the resin which is used as one component of the vehicle, it can be used, for example, one or more materials selected from a group consisting: olefinic resin preferably such as polyethylene resin or polypropylene resin; vinylic resin preferably such as ethylene-vinyl acetate copolymer resin, vinyl chloride-vinyl acetate copolymer resin, vinyl acetate resin or ethyl-vinyl chloride-vinyl acetate copolymer resin; acrylic resin preferably such as methacrylate resin, polyacrylate resin, ethylene-ethyl acrylate copolymer resin or ethylene-methacrylic acid copolymer resin; phenolic resin; polyurethane resin; polyamide resin; polyester resin; ketone resin; alkyd resin; rosin type resin; petroleum resin; maleic acid resin; butyral resin. The above resin may be used alone or as a mixture of two or more of them.

The vehicle may be obtained in utilizing one of the above normal temperature solid waxes or the above resins alone, or may be obtained by mixing the above wax and resin. Preferably, it is better that the wax is used as a main component of the vehicle and the resin is used as an additive component thereof. For instance, it is preferable that the wax is included 30~99.9% by weight ratio in the hot melt ink. Further, it is preferable that the resin is included 0~50% by weight ratio in the hot melt ink.

To the above vehicle, it may be added agents such as agent for giving adhesive property and agent for preparing the melting point, further additive agents such as agent for preparing surface tension, antioxidant, or ultraviolet absorbent. In this case, it may be preferable that total quantity of the above agents is 0~49% by weight ratio in the entire hot melt ink. Further, it may be preferable that quantity of the vehicle lies in a range of 50~99.9% by weight ratio in the entire hot melt ink.

The pigment or the dye as colorant has a property for coloring the hot melt ink and exists in the vehicle in a finely dispersed state or a dissolved state.

Here, as the pigment, it may be used either organic pigment or inorganic pigment, in particular, it can be used the pigment which has dispersibility against the components of the hot melt ink. Especially, as the pigment with good dispersibility, it is preferably used the pigment selected from a group consisting: inorganic pigment such as carbon black; organic pigment such as quinocridone pigment, phthalocyanine pigment, isoindolinone pigment. The above pigment can be used alone or as a mixture of two or more of them. Further, a dye for preparing the color can be added in the pigment.

As the dye, it may be selectively used either oil-soluble dyes or dyes soluble in organic solvent, in particular, it can be used the dye which has solubility against the components of the hot melt ink.

It is preferable that the pigment or the dye mentioned above is added 0.1~10% by weight ratio in the entire hot melt ink by taking the printing density into consideration. More preferably, the pigment or the dye is added 0.5~8% by weight and the best quantity of the pigment or the dye added to the hot melt ink is 0.5~6% by weight.

The hot melt ink according to the embodiment can be prepared as follows.

First, the vehicle including the wax and the resin is melted by heating, thereby the mixture thereof is obtained. While retaining the mixture in a melted liquid state, the pigment or the dye is added thereto and stirred into the mixture. If necessary, the pigment or the dye may be finely smashed by a dispersing device such as a roll mill having three rolls, ball mill, colloid mill, before being added into the mixture of the vehicle. The composition mixed under stirring is filtered by using a mesh filter less than 10 μm while retaining the melted liquid state, thereby the hot melt ink is obtained.

Then, examples for embodying the hot melt ink of the embodiment will be described hereinafter.

(EXAMPLE 1)

In the example 1, the vehicle was composed of paraffin wax (HNP-10, manufactured by NIPPON SEIRO CO., LTD.), paraffin wax derivatives (HAD4080, manufactured by NIPPON SEIRO CO., LTD.) and petroleum resin (NEOPOLYMER-S, NIPPON PETROCHEMICALS CO., LTD.). The pigment as the colorant was carbon black (MA-100, MITSUBISHI CHEMICAL CO., LTD.). Here, in order to efficiently disperse the pigment in the vehicle, it was additionally added aluminium coupling agent such as acetalkoxy aluminium di-isopropylate (PLAIN ACT AL-M, AJINOMOTO CO., INC.), the aluminium coupling agent stabilizing refinement and dispersion of the pigment by chemically coupling to pigment surface.

The composition of the ink in EXAMPLE 1 was as follows.

HNP-10 (parrafin wax) 73 WT %

HAD 5080 (paraffin wax derivatives) 19.8 WT %

NEOPOLYMER (petroleum resin) 5 WT %

MA-100 (carbon black) 2 WT %

PLAIN ACT AL-M (acetalkoxy aluminium di-isopropylate) 0.2 WT %

Figure 4:
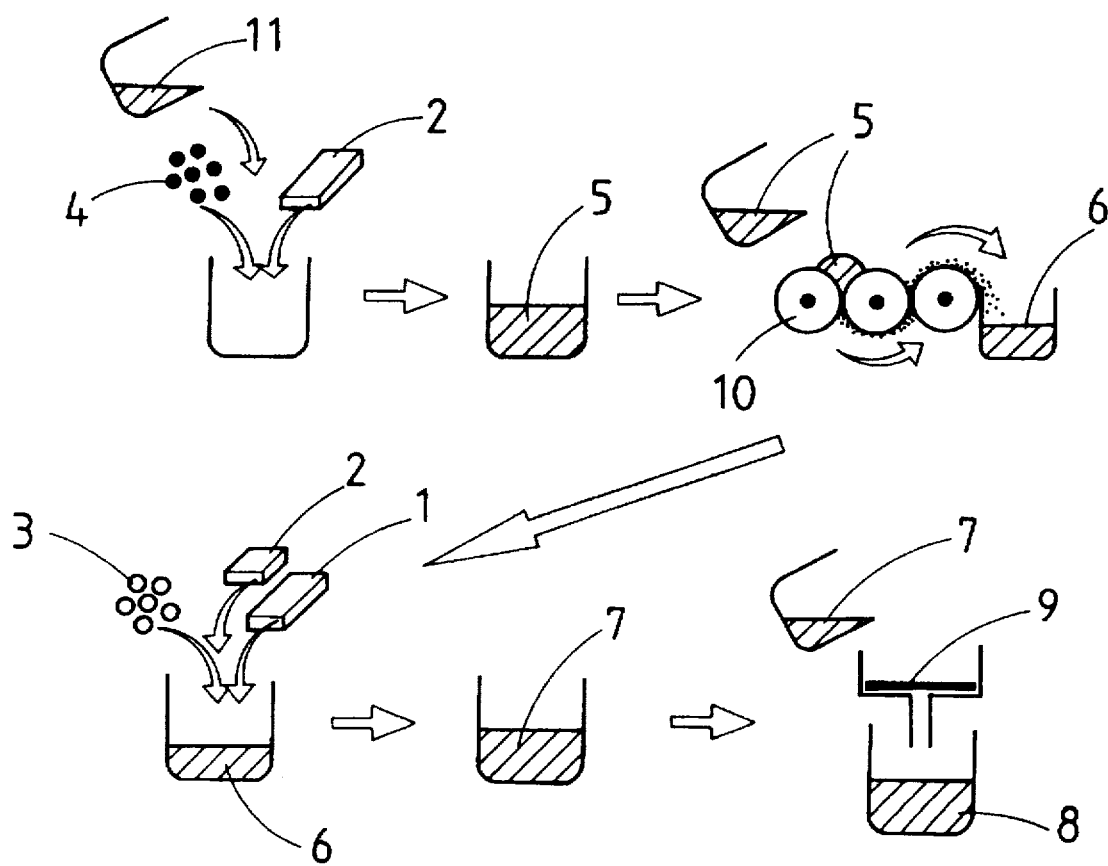
FIG. 4 is a schematic view indicating process for producing the hot melt ink according to the embodiment of the present invention.

The ink composed of the above composition was prepared according to a procedure shown in FIG. 4.

In FIG. 4, first, the paraffin wax 2 (56 weight parts), the carbon black 4 (40 weight parts) and the acetalkoxy aluminium di-isopropylate 11 (4 weight parts) were mixed with each other under heating condition at 100° C., thereby the mixture 5 was obtained. The mixture 5 was passed three times through a SIBON ROLLER 10 manufactured by INOUE MFG. INC., which is a roll mill with three rolls and is capable of controlling rolls temperature, under heating condition at 80° C.

Thus obtained mixture 6 after passing through the roll mill was melted by heating at 120° C., thereafter the paraffin wax 1 (73 weight parts), the paraffin wax derivatives 2 (17 weight parts) and the petroleum resin 3 (5 weight parts) were mixed to the mixture 6, further stirred into the composition 7.

The thus prepared composition 7 was placed by 2 to 3 droplets and melted on a slide glass heated to 120° C., on which a cover glass was placed and pressed slightly. Then, as a result of observation under transmission light by a microscope "XF-UNR" manufactured by NIKON CORPORATION, particles were scarcely observed. Accordingly, it was confirmed that most of the carbon black 4 as the pigment was substantially dispersed with fine particle diameter less than 1 µm, therefore it was confirmed that dispersibility of the pigment was very good. Further, as a result of observation under aging test during which the composition 7 was conserved under a hermetically sealed condition for 30 days at 125° C. in a glass heat-resistant retainer, the carbon black 4 as the pigment was scarcely precipitated, therefore it was confirmed that dispersing stability of the pigment was very good.

After the composition 7 was filtered by a mesh filter with 1 µm in a heat-filtering device manufactured by TOYO ROSHI KAISHA LTD., thereby the hot melt ink 8 was finally obtained.

Then, heat property of the hot melt ink 8 was measured by a DIFFERENTIAL SCANNING CALORIMETER (DSC) "SSC-220" manufactured by SEIKO INSTRUMENTS INC.. As a result of measurement, heat of melting was 190 mJ/mg and softening point was 64° C. Further, viscosity of the hot melt ink 8 in a melted liquid state (viscosity which is measured in a melted liquid state when the ink 8 is heated over the melting point thereof), is measured through a viscometer "DV2+" manufactured by BROOK FIELD CO., LTD.. As a result, the viscosity of the ink 8 at 125° C. was 15 cp.

The hot melt ink 8 of EXAMPLE 1 obtained according to the above can be used suitably as an ink for a hot melt ink type ink jet printer. When the hot melt ink 8 was loaded to an ink jet printer and jetted onto the print sheet while the ink 8 was melted by heating so that an ink jetting temperature became 125° C. As a result of ink jetting, it was found that ink dot diameter was suitable for ink jet printing, covering area by the ink dot was sufficient, and printing density was sufficiently deep. Further, it was not observed a phenomenon where the ink dot is penetrated to the rear surface of the print sheet. And in observing the surface of the ink dot by a microscope, it was confirmed that the ink dot had a very smooth flat face on its top without becoming hemispherical. Further, on the basis of smooth flatness and thinness of the ink dot, it was confirmed that the ink on the print sheet could resist to folding of the print sheet and blurring thereof.

(EXAMPLE 2)

In the example 2, the vehicle was composed of STEARON (KAOWAX T-1, manufactured by KAO CORPORATION), stearic amide (FATTY ACID AMIDE S, manufactured by KAO CO., LTD.) and terpene resin (CLEARON K-100, manufactured by YASUHARA CHEMICAL CO., LTD.). The dye as the colorant was phthalocyanine oil-soluble dye (NEOPEN BLUE 808, manufactured by BASF).

The composition of the ink in EXAMPLE 2 was as follows.

KAOWAX T-1 (STEARON) 40 WT %
FATTY ACID AMIDES (stearic amide) 14 WT %
CLEARON K-100 (terpene resin) 45 WT %
NEOPEN BLUE 808 (phthalocyanine oil-soluble dye) 1 WT %

The ink composed of the above composition was prepared as follows.

First, KAOWAX T-1 (40 weight parts), FATTY ACID AMIDE S (14 weight parts) and CLEARON K-100 (45 weight parts) were mixed with each other under heating condition at 130° C., thereafter NEOPEN BLUE 808 (1 weight part) was added to the obtained mixture and sufficiently stirred. Here, when stirring, a stirrer "DISPERMAT CV" manufactured by VMA GETZMANN CO., LTD. was used.

The thus prepared composition was placed by 2 to 3 droplets and melted on a slide glass heated to 120° C., on which a cover glass was placed and pressed slightly. Then, as a result of observation under transmission light by the microscope "XF-UNR" manufactured by NIKON CORPORATION (mentioned above), particles were scarcely observed. Accordingly, it was confirmed that NEOPEN BLUE as the dye was almost completely dissolved in the composition.

After the composition was filtered by a mesh filter with 1 µm in a heat-filtering device manufactured by TOYO ROSHI KAISRA LTD., thereby the hot melt ink was finally obtained.

Then, heat property of the hot melt ink was measured by a DIFFERENTIAL SCANNING CALORIMETER (DSC) "SSC-220" manufactured by SEIKO INSTRUMENTS INC.. As a result of measurement, heat of melting was 120 mJ/mg and softening point was 60° C. Further, viscosity of the hot melt ink in a melted liquid state (viscosity which is measured in a melted liquid state when the ink is heated over the melting point thereof), is measured through a viscometer "DV2+" manufactured by BROOK FIELD CO., LTD.. As a result, the viscosity of the ink at 135° C. was 20 cp.

The hot melt ink of EXAMPLE 2 obtained according to the above can be used suitably as an ink for a hot melt ink type ink jet printer. When the hot melt ink was loaded to an ink jet printer and jetted onto the print sheet while the ink was melted by heating so that an ink jetting temperature became 135° C. As a result of ink jetting, it was found that ink dot diameter was suitable for ink jet printing, covering area by the ink dot was sufficient, and printing density was clearly deep blue. Further, it was not observed a phenomenon where the ink dot is penetrated to the rear surface of the print sheet. And in observing the surface of the ink dot by a microscope, it was confirmed that the ink dot had a very smooth flat face on its top without becoming hemispherical. Further, on the basis of smooth flatness and thinness of the ink dot, it was confirmed that the ink on the print sheet could resist to folding of the print sheet and blurring thereof. And further, when the ink was also printed on an OHP (Over Head Projector) film utilized in the OHP, it could obtained clear projected images with excellent transparency.

(COMPARATIVE EXAMPLE 1)

In COMPARATIVE EXAMPLE 1, the vehicle was composed of stearic amide (FATTY ACID AMIDE S, manufactured by KAO CO., LTD.) and hydrogenated petroleum resin (ARKON P-100, manufactured by ARAKAWA CHEMICAL INDUSTRIES LTD.). The dye as the colorant was blue oil-soluble dye (KAYASET BLUE 714, manufactured by NIPPON KAYAKU CO., LTD.).

The composition of the ink in COMPARATIVE EXAMPLE 1 was as follows.

FATTY ACID AMIDES (stearic amide) 38 WT %
ARKON P-100 (hydrogenated petroleum resin) 60 WT %
KAYASET BLUE 714 (blue oil-soluble dye) 2 WT %

The ink composed of the above composition in COMPARATIVE EXAMPLE 1 was prepared as follows.

First, FATTY ACID AMIDE S (38 weight parts) and ARKON P-100 (60 weight parts) were mixed with each other under heating condition at 130° C., thereafter KAYASET BLUE 714 (2 weight parts) was added to the obtained mixture and sufficiently stirred through the stirrer "DISPERMAT CV" mentioned above. The thus prepared composition was placed by 2 to 3 droplets and melted on a slide glass heated to 120° C., on which a cover glass was placed and pressed slightly. Then, as a result of observation under transmission light by the microscope "XF-UNR" manufactured by NIKON CORPORATION (mentioned above), particles were scarcely observed. Accordingly, it was confirmed that KAYASET BLUE 714 as the dye was almost completely dissolved in the composition.

After the composition was filtered by a mesh filter with 1 μm in a heat-filtering device manufactured by TOYO ROSHI KAISHA LTD., thereby the hot melt ink was finally obtained. Then, heat property of the hot melt ink was measured by a DIFFERENTIAL SCANNING CALORIMETER (DSC) "SSC-220" manufactured by SEIKO INSTRUMENTS INC.. As a result of measurement, heat of melting was 70 mJ/mg and softening point was 84° C. Further, viscosity of the hot melt ink in a melted liquid state (viscosity which is measured in a melted liquid state when the ink is heated over the melting point thereof), is measured through a viscometer "DV2+" manufactured by BROOK FIELD CO., LTD.. As a result, the viscosity of the ink at 150° C. was 45 cp.

When the hot melt ink of COMPARATIVE EXAMPLE 1 obtained according to the above was loaded to an ink jet printer and jetted onto the print sheet while the ink was melted by heating so that an ink jetting temperature became 150° C. As a result of ink jetting, it was found that ink dot was solidified without sufficiently spreading on the print sheet since the heat of melting is low, the softening point is high and the viscosity is high. Therefore, covering area by the ink dot was not sufficient, and printing density was very thin. Further, in observing the surface of the ink dot by a microscope, it was confirmed that the ink dot had a hemispherical face on its top, as a result, it was confirmed that the ink on the print sheet could not resist to folding of the print sheet and blurring thereof. And further, when the ink was also printed on an OHP (Over Head Projector) film utilized in the OHP, there was obtained only dark projected images with poor transparency due to light scattering occurring on hemispherical ink dot surface.

(COMPARATIVE EXAMPLE 2)

In COMPARATIVE EXAMPLE 2, the vehicle was composed of laurone (reagent), oxidized polyethylene wax (POWAX H-10, manufactured by NIPPON PETROLEUM CO., LTD.) and ethylene-vinylacetate copolymer resin (EVA210, manufactured by DUPONT-MITSUI POLYCHEMICALS CO., LTD.). The pigment as the colorant was red quinocridone pigment (HOSTAPERM PINK E02 TONERGRADE, manufactured by HOECHIST).

The composition of the ink in COMPARATIVE EXAMPLE 2 was as follows.

laurone 87 WT %
POWAX H-10 (oxidized polyethylene wax) 5 WT %
EVA210 (ethylene-vinylacetate copolymer resin) 5 WT %
HOSTAPERM PINK E02 TONERGRADE (red quinocridone pigment) 3 WT %

The ink composed of the above composition in COMPARATIVE EXAMPLE 2 was prepared as follows.

First, POWAX H-10 (50 weight parts) and HOSTAPERM PINK E02 TONERGRADE (30 weight parts) were mixed with each other under heating condition at 100° C., thereafter the obtained mixture was passed three times through the SIBON ROLLER mentioned above under heating condition at 75° C.

The thus prepared mixture (8 weight parts) after passing through the roll mill was melted by heating at 120° C., thereafter laurone (87 weight parts) and EVA210 (5 weight parts) were added thereto and stirred.

The prepared composition according to the above was placed by 2 to 3 droplets and melted on a slide glass heated to 120° C., on which a cover glass was placed and pressed slightly. Then, as a result of observation under transmission light by the microscope "XF-UNR" manufactured by NIKON CORPORATION mentioned above), particles were scarcely observed. Accordingly, it was confirmed that HOSTAPERM PINK E02 TONERGRADE as quinocridone pigment was substantially dispersed with fine particle diameter less than 1 μm, therefore it was confirmed that dispersibility of the pigment was very good. Further, as a result of observation under aging test during which the composition was conserved under a hermetically sealed condition for 30 days at 125° C. in a glass heat-resistant retainer, the pigment was scarcely precipitated, therefore it was confirmed that dispersing stability of the pigment was very good.

After the composition was filtered by a mesh filter with 1 μm in a heat-filtering device manufactured by TOYO ROSHI KAISHA LTD., thereby the hot melt ink was finally obtained.

Then, heat property of the hot melt ink was measured by a DIFFERENTIAL SCANNING CALORIMETER (DSC) "SSC-220" manufactured by SEIKO INSTRUMENTS INC.. As a result of measurement, heat of melting was 240 mJ/mg and softening point was 65° C. Further, viscosity of the hot melt ink in a melted liquid state (viscosity which is measured in a melted liquid state when the ink is heated over the melting point thereof), is measured through a viscometer "DV2+" manufactured by BROOK FIELD CO., LTD.. As a result, the viscosity of the ink at 145° C. was 8 cp. When the hot melt ink of COMPARATIVE EXAMPLE 2 obtained according to the above was loaded to an ink jet printer and jetted onto the print sheet while the ink was melted by heating so that an ink jetting temperature became 145° C. As a result of ink jetting, it was found that ink dot was solidified in a spreading state on the print sheet due to low heat of melting and low viscosity, thereby the ink dot was blurred on the print sheet and penetrated to the rear surface of the print sheet. Further, it was confirmed that printing density was made thin since the ink was penetrated into the print sheet. Further, in observing the surface of the ink dot by a microscope, it was confirmed that colored fibers of the print sheet were clearly recognized since the ink dot was penetrated into the print sheet.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A hot melt ink utilizable for an ink jet printer, the hot melt ink existing in a solid state at a room temperature and being used in liquid state after melted, the hot melt ink comprising:

a vehicle which retains the solid state at the room temperature and is melted into the liquid state by heating over a melting point thereof; and a colorant;

wherein a heat of melting lies in a range of 100–200 mJ/mg, a softening point lies in a range of 50°–70° C. and a viscosity lies in a range of 10–30 cp at a fusible temperature higher than the melting point, wherein the vehicle further includes one or more resins selected from the group consisting of: olefinic resin selected from the group consisting of polyethylene resin, polypropylene resin; vinylic resin selected from the group consisting of ethylene-vinyl acetate copolymer resin, vinyl chloride-vinyl acetate copolymer resin, vinyl acetate resin, ethyl-vinyl chloride-vinyl acetate copolymer resin; acrylic resin selected from the group consisting of methacrylate resin, polyacrylate resin, ethylene-ethyl acrylate copolymer resin, ethylene-methacrylic acid copolymer resin; phenolic resin; polyurethane resin; polyamide resin; polyester resin; ketone resin; alkyd resin; rosin resin; petroleum resin; maleic acid resin; butyral resin and terpene resin.

2. The hot melt ink according to claim 1, wherein the solid wax is used for a main component and the resin is used for an additive agent, in the vehicle.

3. The not melt ink according to claim 1, consists essentially of 30% to about 99.9% by weight ratio of the solid wax in the hot melt ink.

4. The hot melt ink according to claim 1, consists essentially of up to 50% by weight of the resin in the hot melt ink.

5. A hot melt ink utilizable for an ink-jet printer, the hot melt ink existing in a solid state at a room temperature and being used in liquid state after melted, the hot melt ink comprising:

a vehicle which retains the solid state at the room temperature and is melted into the liquid state by heating over a melting point thereof; and a colorant;

wherein a heat of melting lies in a range of 100–200 mJ/mg, a softening point lies in a range of 50°–70° C. and a viscosity lies in a range of 10–30 cp at an jetting temperature higher than the melting point, the jetting temperature lying in a range of 110° C.–150° C. and the fused hot melt ink being jetted from nozzles installed in the ink-jet printer at the jetting temperature, wherein the vehicle further includes one or more resins selected from the group consisting of: olefinic resin selected from the group consisting of polyethylene resin, polypropylene resin; vinylic resin selected from the group consisting of ethylene-vinyl acetate copolymer resin, vinyl chloride-vinyl acetate copolymer resin, vinyl acetate resin, ethyl-vinyl chloride-vinyl acetate copolymer resin; acrylic resin selected from the group consisting of methacrylate resin, polyacrylate resin, ethylene-ethyl acrylate copolymer resin, ethylene-methacrylic acid copolymer resin; phenolic resin; polyurethane resin; polyamide resin; polyester resin; ketone resin; alkyd resin; rosin resin; petroleum resin; maleic acid resin; butyral resin and terpene resin.

6. The hot melt ink according to claim 5, wherein the jetting temperature lies in a range of 125° C.–150° C.

7. The hot melt ink according to claim 5, wherein the melting point of the vehicle is more than 50° C.

8. The hot melt ink according to claim 5, consists essentially of 50% to about 99.9% by weight ratio of the vehicle in the hot melt ink.

9. The hot melt ink according to claim 5, consists essentially of 0.1% to about 10% by weight ratio of the colorant in the hot melt ink.

10. The hot melt ink according to claim 9, consists essentially of 0.5% to about 8% by weight ratio of the colorant in the hot melt ink.

11. The hot melt ink according to claim 10, consists essentially of 0.5% to about 6% by weight ratio of the colorant in the hot melt ink.

12. The hot melt ink according to claim 5, wherein the vehicle includes a solid wax which retains a solid state at the room temperature, the solid wax being selected from the group consisting of: petroleum wax selected from the group consisting of paraffin wax, microcrystalline wax; mineral wax selected from the group consisting of montan wax, ozokerite, ceresin; wax of plant origin selected from the group consisting of candelilla wax, carnauba wax, rice wax, hohoba solid wax; wax of animal origin selected from the group consisting of bee wax, lanolin wax, whale wax; synthesized hydrocarbon selected from the group consisting of Fischer-Tropsch wax, polyethylene wax; hydrogenated wax selected from the group consisting of hardened castor oil, hardened castor oil derivatives; denatured wax selected from the group consisting of montan wax derivatives, paraffin wax derivatives, microcrystalline wax derivatives, polyethylene wax derivatives; higher fatty acid selected from the group consisting of behenic acid, stearic acid, palmitic, myristic acid, lauric acid; higher alcohol selected from the group consisting of stearyl alcohol, behenyl alcohol; hydroxystearic acid selected from the group consisting of 1,2-hydroxy stearic acid, 1,2-hydroxy stearic acid derivatives; ketone selected from the group consisting of stearone, laurone; fatty acid amide selected from the group consisting of lauric amide, stearic amide, oleic amide, eruca amide, ricinoleic amide, 1,2-hydroxy stearic amide, N-substituted fatty acid amide; amine selected from the group consisting of dodecyl amine, tetradecyl amine, octadecyl amine; ester selected from the group consisting of methyl stearate, octadecyl stearate, glycerine fatty acid ester, sorbitan fatty acid ester, propylene glycol fatty acid ester, ethylene glycol fatty acid ester, polyoxyethylene fatty acid ester; polymer wax selected from α-olefin maleic acid anhydride copolymer wax.

13. The hot melt ink according to claim 5, wherein the colorant is one or more pigments selected from the group consisting of: inorganic pigment selected from carbon black; organic pigment selected from the group consisting of quinocridone pigment, phthalocanine pigment, isoindolinone pigment.

14. The hot melt ink according to claim 5, wherein the colorant is one or more dyes selected from the group consisting oil-soluble dyes, or dyes soluble in organic solvent.

* * * * *